United States Patent
Zannoth et al.

(10) Patent No.: US 11,716,028 B2
(45) Date of Patent: Aug. 1, 2023

(54) DRAIN-TO-SOURCE MONITORING OF POWER SWITCHES IN A HALF-BRIDGE DURING RUNTIME

(71) Applicant: Infineon Technologies AG, Neubiberg (DE)

(72) Inventors: Markus Zannoth, Neubiberg (DE); Cristian Murtaza, Bucharest (RO); Peter Stemplinger, Madrid (ES)

(73) Assignee: Infineon Technologies AG, Neubiberg (DE)

( * ) Notice: Subject to any disclaimer, the term of this patent is extended or adjusted under 35 U.S.C. 154(b) by 120 days.

(21) Appl. No.: 17/479,724

(22) Filed: Sep. 20, 2021

(65) Prior Publication Data

US 2023/0087438 A1    Mar. 23, 2023

(51) Int. Cl.
*H02M 3/335*    (2006.01)
*H02M 1/096*    (2006.01)
*H02M 1/00*    (2006.01)

(52) U.S. Cl.
CPC ..... *H02M 3/33571* (2021.05); *H02M 1/0058* (2021.05); *H02M 1/096* (2013.01)

(58) Field of Classification Search
CPC ........... H02M 3/33571; H02M 1/0058; H02M 1/096; H03K 3/00; H03K 17/06; H03K 17/16; H03K 17/687; H03K 19/00; H03K 17/0412
See application file for complete search history.

(56) References Cited

U.S. PATENT DOCUMENTS

2020/0295759 A1*   9/2020   Akahane ........ H03K 19/017509

OTHER PUBLICATIONS

U.S. Appl. No. 17/479,809, filed Sep. 20, 2021, naming inventors Murtaza et al.

* cited by examiner

*Primary Examiner* — Wei (Victor) Y Chan
(74) *Attorney, Agent, or Firm* — Shumaker & Sieffert, P.A.

(57) ABSTRACT

A driver circuit controls a half-bridge that includes a high-side power switch and a low-side power switch. The driver circuit may comprise a high-side compare unit configured to determine a first drain-to-source voltage, wherein the first drain-to-source voltage is associated with the high-side power switch when the high-side power switch is ON, and a low-side compare unit configured to determine a second drain-to-source voltage, wherein the second drain-to-source voltage is associated with the low-side power switch when the low-side power switch is ON. The high-side compare unit may be further configured to determine a third drain-to-source voltage, wherein the third drain-to-source voltage is associated with the high-side power switch when the high-side power switch is OFF, and the low-side compare unit may be further configured to determine a fourth drain-to-source voltage, wherein the fourth drain-to-source voltage is associated with the low-side power switch when the low-side power switch is OFF.

22 Claims, 4 Drawing Sheets

DRAIN-TO-SOURCE MONITORING OF POWER SWITCHES IN A HALF-BRIDGE DURING RUNTIME

TECHNICAL FIELD

This disclosure relates to power switches, and more specifically, techniques and circuits for monitoring the operation of power switches that are arranged in a half-bridge.

BACKGROUND

Field Effect Transistors (FETs) are often used as power switches to control the delivery of power to a load. Examples of FETs may include, but are not limited to, junction field-effect transistor (JFET), metal-oxide-semiconductor FET (MOSFET), dual-gate MOSFET, any other type of FET, or any combination of the same. Examples of MOSFETS may include, but are not limited to, PMOS, NMOS, DMOS, or any other type of MOSFET, or any combination of the same. MOSFETs may be formed in silicon, gallium nitride, silicon carbide, or other materials.

Power switches are typically controlled by a driver circuit via a modulation control signal, such as pulse width modulation (PWM), pulse frequency modulation (PFM), pulse duration modulation, pulse density modulation, or another type of modulation control signal. Modulation control signals can be applied to the gate of a power switch so as to control ON/OFF switching of the power switch, and thereby control the average amount of power delivered through the power switch to a load. The ON/OFF switching of the power switch effectively chops its power delivery up into discrete parts. The average value of voltage and/or current fed to a load can be controlled by turning the switch on and off at a fast rate. The longer the switch is on compared to the off periods, the higher the total power supplied to the load.

In many applications, two different power witches are configured in a high-side and low-side configuration, and the ON/OFF switching of the two power switches is synchronized in order to deliver the desired power to a switch node positioned between the high-side and low-side power switch. Moreover, in some system, different sets of high-side and low-side power switches may be used to control different phases of a multi-phase electrical motor.

SUMMARY

In general, this disclosure describes circuits and techniques that are applied by a driver circuit or a system in controlling two different power switches that are arranged in a half-bridge configuration. The circuits and techniques may monitor the power switches during operation of the half-bridge to ensure that the power switches are properly functioning and to ensure that each power switch does not exhibit a short circuit when the power switch is turned ON. In addition, the circuits and techniques of this disclosure may also perform additional monitoring when the power switches are turned OFF, in order to ensure that the monitoring circuitry is functioning properly.

The circuits and techniques of this disclosure may facilitate safety checks on the operation of the power switches and may also facilitate self-tests of the circuitry during operation to ensure that the monitoring circuitry is functioning properly. The two power switches in the half-bridge may operate in a complementary fashion, e.g., turning ON and OFF in a complementary manner. When the high-side power switch is turned ON, the low-side power switch is turned OFF, and vice versa. Moreover, when the high-side power switch is turned ON, a high-side compare unit may monitor the drain-to-source voltage of the high-side power switch to determine whether there is a short circuit. Similarly, when low-side power switch is turned ON, a low-side compare unit may monitor the drain-to source-voltage of the low-side power switch to determine whether there is a short circuit.

According to this disclosure, the high-side compare unit may also monitor the drain-to-source voltage of the high-side power switch when the high-side power switch is turned OFF, in order to determine whether the high-side compare unit is functioning properly. Moreover, the low-side compare unit may also monitor the drain-to-source voltage of the low-side power switch when the low-side power switch is turned OFF, in order to determine whether the low-side compare unit is functioning properly. In this way, the techniques and circuits of this disclosure can achieve a reliable and continuous self-test on the comparators during runtime of the half-bridge.

In one example, this disclosure describes a driver circuit configured to control a half-bridge that includes a high-side power switch and a low-side power switch. The driver circuit comprises a high-side compare unit configured to determine a first drain-to-source voltage, wherein the first drain-to-source voltage is associated with the high-side power switch when the high-side power switch is ON, and a low-side compare unit configured to determine a second drain-to-source voltage, wherein the second drain-to-source voltage is associated with the low-side power switch when the low-side power switch is ON. Moreover, according to this disclosure, the high-side compare unit is further configured to determine a third drain-to-source voltage, wherein the third drain-to-source voltage is associated with the high-side power switch when the high-side power switch is OFF, and the low-side compare unit is further configured to determine a fourth drain-to-source voltage, wherein the fourth drain-to-source voltage is associated with the low-side power switch when the low-side power switch is OFF.

In another example, this disclosure describes a system comprising: a control unit, and a driver circuit configured to receive control signals from the control unit and to control a half-bridge based on the control signals, wherein the half-bridge includes a high-side power switch and a low-side power switch. The driver circuit of the system comprises a high-side compare unit configured to determine a first drain-to-source voltage, wherein the first drain-to-source voltage is associated with the high-side power switch when the high-side power switch is ON; and a low-side compare unit configured to determine a second drain-to-source voltage, wherein the second drain-to-source voltage is associated with the low-side power switch when the low-side power switch is ON. The high-side compare unit is further configured to determine a third drain-to-source voltage, wherein the third drain-to-source voltage is associated with the high-side power switch when the high-side power switch is OFF, and the low-side compare unit is further configured to determine a fourth drain-to-source voltage, wherein the fourth drain-to-source voltage is associated with the low-side power switch when the low-side power switch is OFF.

In another example, this disclosure describes a method of controlling a half-bridge that includes a high-side power switch and a low-side power switch. The method comprises determining a first drain-to-source voltage, wherein the first drain-to-source voltage is associated with the high-side power switch when the high-side power switch is ON; determining a second drain-to-source voltage, wherein the second drain-to-source voltage is associated with the low-side power switch when the low-side power switch is ON; determining a third drain-to-source voltage, wherein the third drain-to-source voltage is associated with the high-side power switch when the high-side power switch is OFF; and determining a fourth drain-to-source voltage, wherein the fourth drain-to-source voltage is associated with the low-side power switch when the low-side power switch is OFF.

Details of these and other examples are set forth in the accompanying drawings and the description below. Other features, objects, and advantages will be apparent from the description and drawings, and from the claims.

DETAILED DESCRIPTION

Figure 1:
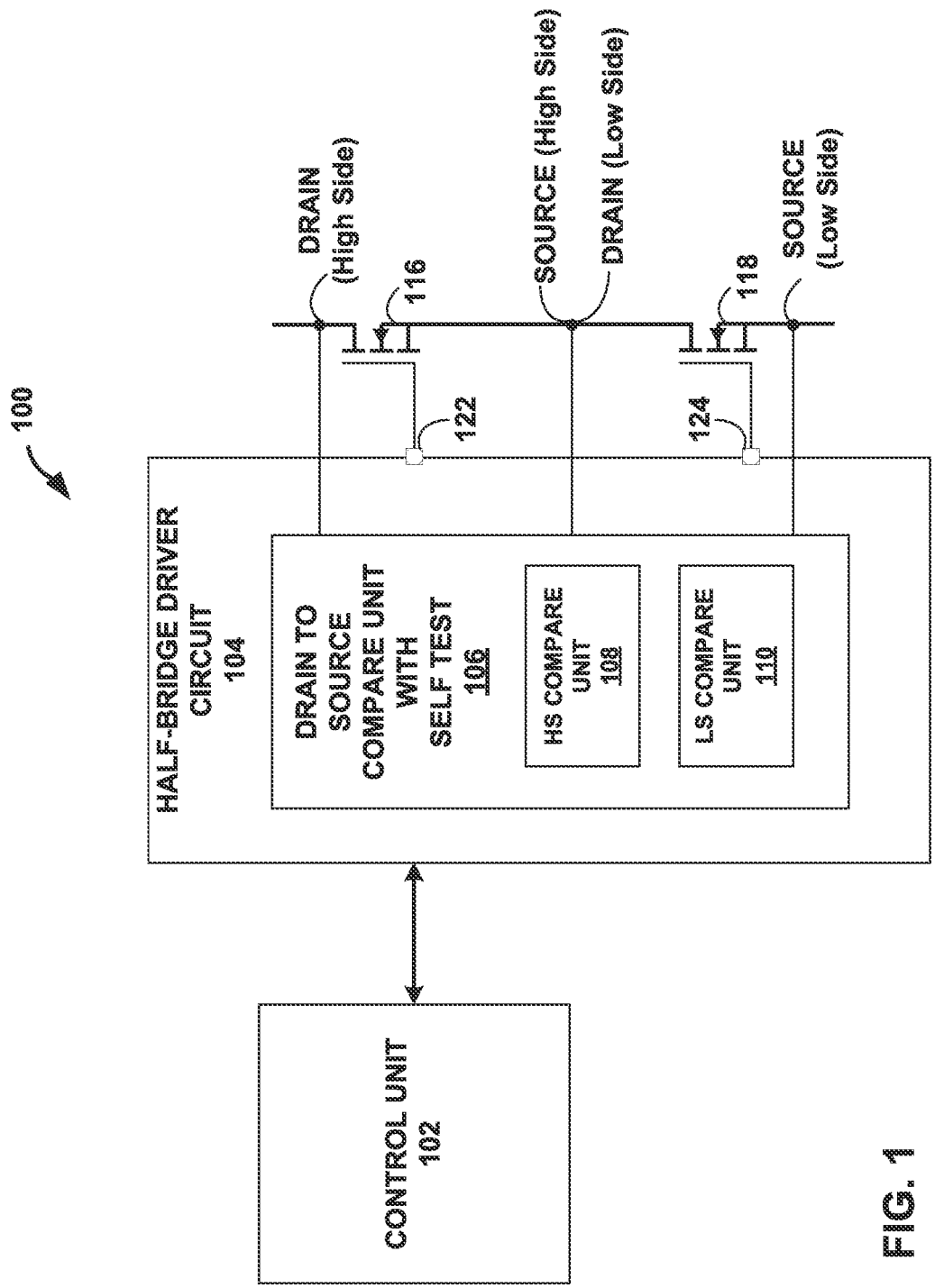
FIG. 1 is a block diagram of a system comprising a half-bridge driver circuit that controls two power switches in a half-bridge configuration and monitors operation of the power switches according to this disclosure.

This disclosure describes circuits and techniques that are applied by a driver circuit or a larger system that controls two different power switches arranged in a half-bridge configuration. The circuits and techniques can provide protection against power switch malfunction, which may be desirable in a wide variety of circuit applications, especially in settings where safety is a concern, such as for circuits that control components of a vehicle. The circuits and techniques may also facilitate self-testing of the power switches during operation of the half-bridge and without a separate self-test routine.

It is often desirable to monitor operation of power switches in order to promote safety and identify potential fault conditions. The circuits and techniques of this disclosure may monitor the power switches during operation of the half-bridge to ensure that the power switches are properly functioning and to ensure that each power switch does not exhibit a short circuit when the power switch is turned ON. In addition, the circuits and techniques of this disclosure may also perform additional monitoring when the power switches are turned OFF, in order to ensure that the monitoring circuitry is functioning properly.

The circuits and techniques of this disclosure may facilitate safety checks on the operation of the power switches and may also facilitate self-tests of the circuitry during operation to ensure that the monitoring circuitry is reliable. The two different power switches in the half-bridge may operate in a complementary fashion, e.g., turning ON and OFF in a complementary manner. When the high-side power switch is turned ON, the low-side power switch is turned OFF, and similarly, when the low-side power switch is turned ON, the high-side power switch is turned OFF. Moreover, when the high-side power switch is turned ON, a high-side compare unit may monitor the drain-to-source voltage of the high-side power switch to determine whether there is a short circuit. Similarly, when low-side power switch is turned ON, a low-side compare unit may monitor the drain-to-source voltage of the low-side power switch to determine whether there is a short circuit.

According to this disclosure, the high-side compare unit may also monitor the drain-to-source voltage of the high-side power switch when the high-side power switch is turned OFF, in order to determine whether the high-side compare unit is functioning properly. Moreover, the low-side compare unit may also monitor the drain-to-source voltage of the low-side power switch when the low-side power switch is turned OFF, in order to determine whether the low-side compare unit is functioning properly. In this way, the techniques and circuits of this disclosure can achieve a reliable and continuous self-test on the comparators during runtime of the half-bridge. Moreover, the techniques may eliminate the need for special self-test routines to check on the operational integrity of the compare units, which are typically performed at start-up, prior to operation of the half-bridge.

The half-bridge circuits of this disclosure may be used in a wide variety of power circuit operation in vehicles or other settings. As one example, the half-bridge may control one phase of a multi-phase electric motor, such as a motor used in vehicles for controlling a power steering, brakes, or other vehicle function. In the example of a multi-phase electrical motor, the circuits and techniques of this disclosure may apply to a plurality of different half-bridge circuits associated with each of a plurality of phases of the electric motor.

FIG. 1 is a block diagram showing a half-bridge driver circuit 104 configured to control operation of a high-side power switch 116 and a low-side power switch 118 that are arranged in a half-bridge configuration. In particular, half-bridge driver circuit 104 is configured to control power switches 116, 118 in a complementary fashion. Half-bridge driver circuit 104 comprises a first output pin 122 configured to deliver signals to a gate of high-side power switch 116 in order to control an ON/OFF state of high-side power switch 116. In addition, half-bridge driver circuit 104 comprises a second output pin 124 configured to deliver signals to a gate of low-side power switch 118 in order to control an ON/OFF state of low-side power switch 118. Half-bridge driver circuit 104 may comprise circuitry capable of generating sufficient voltages based on a supply. For example, half-bridge driver circuit 104 may comprise one or more DC/DC power converters, one or more charge pumps, or possibly one or more external buffer integrated circuit (IC) that can generate the voltages needed on first and second output pins 122, 124 to control the gates of power switches 116, 118.

Half-bridge driver circuit 104 may deliver pulse modulation signals to the gates of power switches 116, 118 in order to control power switches 116, 118 ON and OFF in a complementary manner. When the high-side power switch 116 is turned ON, low-side power switch 118 is turned OFF, and similarly, when the low-side power switch 118 is turned ON, high-side power switch 116 is turned OFF. In some cases, there may be a brief period of so-called "dead time" in each switching cycle when both power switches are OFF for a brief period, which can help ensure that both switches are never ON simultaneously.

The pulse modulation signals delivered to the gates of power switches 116 and 118 via output pins 122 and 124 may comprise pulse width modulation (PWM) signals, pulse frequency modulation (PFM) signals, pulse duration modulation signals, pulse density modulation signals, or other types of modulation signals for controlling power switches. Control unit 102 may send control signals to half-bridge driver circuit 104 that define the modulation signals delivered to the gates of power switches 116 and 118 via output pins 122 and 124. Control unit 102, for example, may comprise a microprocessor, a controller, an application specific integrated circuit (ASIC), or another circuit capable of delivering control signals to a bridge driver. The source and the drain of power switches 116, 118 are labeled, as such, in FIG. 1. The source of high-side power switch 116 corresponds to the drain of low-side power switch 118, and therefore, in some examples, a common pin may be used by half-bridge driver 104 for this common node.

As shown in FIG. 1, half bridge driver circuit 104 includes a drain-to-source compare unit 106 with self-testing capabilities. More specifically, half-bridge driver circuit 104 includes a high-side compare unit 108 and a low-side compare unit 110, which each comprise one or more comparators, analog-to-digital converters, or other circuits capable of comparing two different voltages. High-side compare unit 108 is configured to determine a first drain-to-source voltage, wherein the first drain-to-source voltage is associated with high-side power switch 116 when high-side power switch 116 is ON. Similarly, low-side compare unit 110 configured to determine a second drain-to-source voltage, wherein the second drain-to-source voltage is associated with low-side power switch 118 when low-side power switch is ON 118. These comparisons when the switches are ON may be used to identify a potential short circuit in one of power switches 116, 118, in which case, a fault signal can be sent to control unit 102. In this case, control unit 102 may disable half-bridge circuit 104 or otherwise limit operation of half-bridge circuit 104 due to a fault in one of power switches 116, 118.

According to this disclosure, the same high-side compare unit 108 used for testing high-side power switch 116 when high-side power switch 116 is ON may also be used for self-testing high-side compare unit 108 when high-side power switch 116 is OFF. Moreover, the same low-side compare unit 110 used for testing low-side power switch 118 when low-side power switch 118 is ON may also be used for self-testing low-side compare unit 110 when low-side power switch 118 is OFF. Thus, high-side compare 108 unit is further configured to determine a third drain-to-source voltage, wherein the third drain-to-source voltage is associated with high-side power switch 116 when high-side power switch 116 is OFF, and low-side compare unit 110 is further configured to determine a fourth drain-to-source voltage, wherein the fourth drain-to-source voltage is associated with low-side power switch 118 when low-side power switch 118 is OFF.

High-side power switch 116 may be similar to low-side power switch 118, and therefore, in many situations, similar thresholds may be used in monitoring both switches. Thus, the first drain-to-source threshold used for monitoring high-side power switch 116 when high-side power switch 116 is ON may be equal to the second drain-to-source threshold used for monitoring low-side power switch 118 when low-side power switch 118 is ON. Similarly, the third drain-to-source threshold used for the self-test of high-side compare unit 108 when high-side power switch 116 is OFF may be equal to the fourth drain-to-source threshold used for the self-test of low-side compare unit 110 when low-side power switch 118 is OFF. In some examples, the first and second drain-to-source thresholds may be different than the third and fourth drain-to-source thresholds since the first and second thresholds are used for monitoring power switches in an ON state and the third and fourth thresholds are used for self-test monitoring of comparators when the respective power switch is in OFF state.

The thresholds used by high-side compare unit 108 and low-side compare unit 110 may be configurable for different power switch applications such that half-bridge driver circuit 104 could be used with different types or different ratings of power switches. As one example, an ON state may expect minimal drain-to-source voltage, e.g., less than 100-300 mV. An OFF state may expect substantial drain-to-source voltage, e.g., greater than 600 mV, such as 1.5 V. As one example, thresholds can be defined such that an ON state of a given power switch (without a short) is confirmed by a drain-to-source voltage less than 300 mV, and comparator operation with a given power switch in the OFF state is confirmed by drain-to-source voltage greater than 600 mV. Other thresholds could also be used. It is also possible to use the same threshold for each comparison, e.g., 300 mV, whereby a drain-to-source voltage less than 300 mV confirms an ON state and a drain-to-source voltage greater than 300 mV confirms an OFF state.

In some examples, half bridge driver circuit 104 may be configured to output one or more fault signals to control unit 102 based on determinations by high-side compare unit 108 and low-side compare unit 110. Moreover, a given type of fault (e.g., a fault in the transistor, or a fault due to a malfunctioned compare unit) may depend on whether the fault is identified when the power switch is ON (indicating a fault in the power switch) or when the power switch is OFF (indicating a fault due to a malfunctioned compare unit). A fault in the power switch is referred to herein as a TYPE 1 fault, whereas a fault due to a malfunctioned compare unit is referred to herein as a TYPE 2 fault.

Half bridge driver circuit 104 may be configured to output a first power switch fault signal (e.g., a TYPE 1 fault in high-side power switch 116) to control unit 102 in response to the first drain-to-source voltage being higher than a first drain-to-source threshold and output a second power switch fault signal (e.g., a TYPE 1 fault in low-side power switch 118) to control unit 102 in response to the second drain-to-source voltage being higher than a second drain-to-source threshold. In response to a TYPE 1 fault, control unit 102 may be configured to disable half-bridge circuit 104 or possibly define a more limited low function mode of operation. Control unit 102 may also issue a maintenance alert for the system, and possibly inhibit one or more vehicle functions associated with the system shown in FIG. 1. In some cases, half-bridge driver circuit 104 can even be configured to disable or limit operation of the half-bridge in response to outputting the first or second fault signals to identify a TYPE 1 fault, which may be desirable in some applications to improve the reaction time in response to a TYPE 1 fault.

Half bridge driver circuit 104 may also be configured to output a first comparator fault signal (e.g., a TYPE 2 fault in high-side compare unit 108) to control unit 102 in response to the third drain-to-source voltage being lower than a third drain-to-source threshold, and output a second comparator fault signal (e.g., a TYPE 2 fault in low-side compare unit 110) to control unit 102 in response to the fourth drain-to-source voltage being lower than a fourth drain-to-source threshold. In response to a TYPE 2 fault, control unit 102 may be configured to issue a maintenance alert for the system, possibly inhibiting one or more vehicle functions associated with the system. A TYPE 2 fault merely indicates that the monitoring functions are unreliable. Thus, since a TYPE 2 fault does not necessarily imply any problems with power switches 116 or 118 (but merely indicates a problem with compare unit 108 or 110), in some examples, a maintenance alert without inhibiting vehicle functions may be an appropriate response by control unit 102 upon receiving a TYPE 2 fault.

Figure 2:
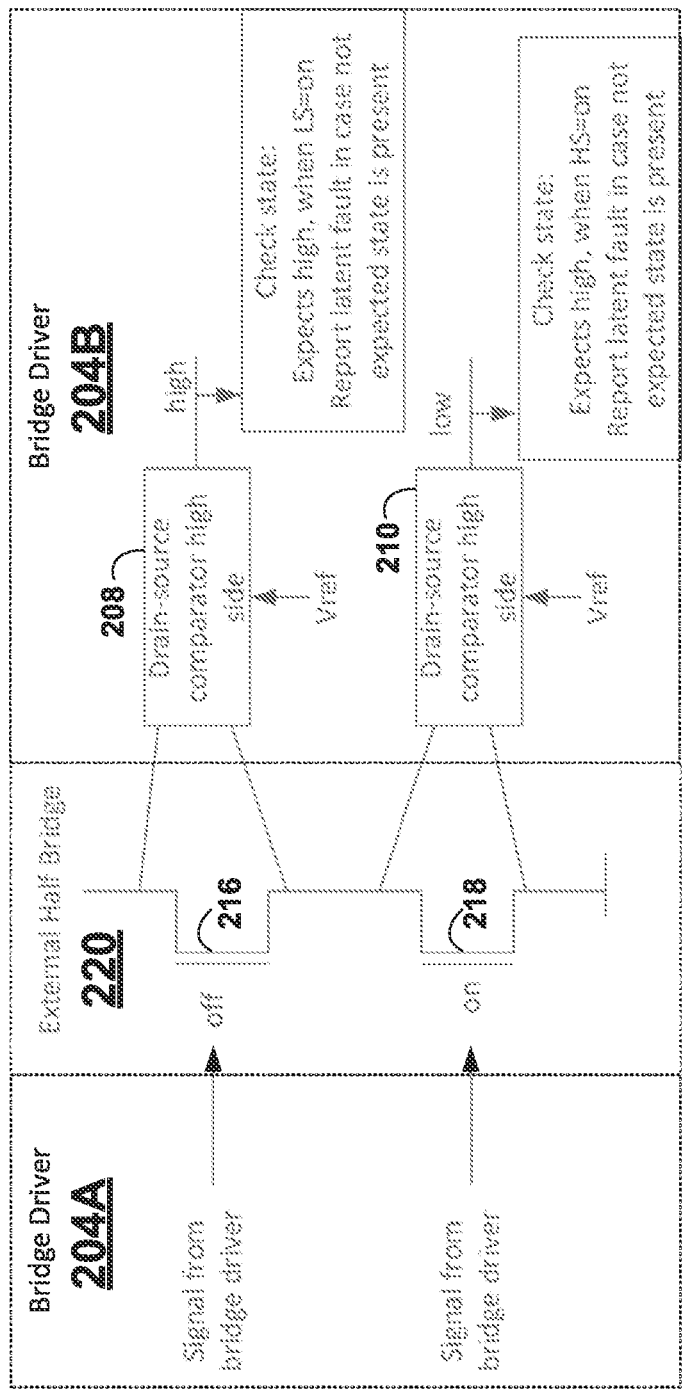
FIG. 2 is a conceptual diagram of bridge driver controlling two power switches in an external half-bridge.

FIG. 2 is a conceptual diagram of bridge driver (204A and 204B) controlling two power switches 216, 218 in an external half-bridge 220. As shown, bridge driver 204A sends ON/OFF signals to gates of power switches 216, 218 in order to control power switches 216, 218 ON and OFF in a complementary manner. When the high-side power switch 216 is turned ON, low-side power switch 218 is turned OFF, and similarly, when the low-side power switch 218 is turned ON, high-side power switch 216 is turned OFF. As mentioned above, in some cases, there may be a brief period of so-called "dead time" in each switching cycle when both power switches are OFF for a brief period, which can help ensure that both switches are never ON simultaneously.

In the example shown in FIG. 2, bridge driver 204B includes a high-side drain-to-source comparator 208 and a low-side drain-to-source comparator 210. According to this disclosure, high-side drain-to-source comparator 208 and a low-side drain-to-source comparator 210 both provide useful logic signals when high-side power switch 216 is ON and low-side power switch 218 is OFF. In addition, high-side drain-to-source comparator 208 and a low-side drain-to-source comparator 210 both provide useful logic signals when high-side power switch 216 is OFF and low-side power switch 218 is ON. Thus, high-side drain-to-source comparator 208 and low-side drain-to-source comparator 210 both provide useful logic signals in both the ON phase and the OFF phase of each of power switches 216 and 218.

In particular, high-side drain-to-source comparator 208 compares the drain-to-source voltage to a reference (Vref), such as 300 mV. Bridge driver 204B expects a high value from high-side drain-to-source comparator 208 when high-side power switch 216 is OFF and low-side power switch 218 is ON. If there is no high value from high-side drain-to-source comparator 208 when high-side power switch 216 is OFF and low-side power switch 218 is ON, then bridge driver 204B may report a latent fault to a control unit. This latent fault may indicate that high-side drain-to-source comparator 208 is not necessarily reliable. Similarly, bridge driver 204B expects a high value from low-side drain-to-source comparator 210 when low-side power switch 218 is OFF and high-side power switch 216 is ON. If there is no high value from low-side drain-to-source comparator 210 when high-side power switch 216 is ON and low-side power switch 218 is OFF, then bridge driver 204B may report a latent fault to a control unit.

The circuits and techniques of this disclosure may significantly reduce the detection time associated with a TYPE 2 fault (e.g., to be smaller than Fault tolerant time interval associated a vehicle feature associated with safety, such as power steering). The circuits and techniques can also deliver permanent and continuous monitoring during run time, as opposed to monitoring at the start-up only.

In some examples, the system can check to confirm that all of the comparators are toggling, and if a comparator state cannot be reached, an alert can be issued in the system. The check can be performed for each power switch within every PWM period, which is much more often than once at powering up the circuit. The only additional circuitry needed to implement the system may comprise logic to check the output of the comparator during the OFF state, when a power switch is inactive.

The circuits and technique may also provide advantages of a much faster reaction time than can be achieved without the described circuits. Therefore, the circuits and techniques can be used as a safety mechanism ensuring that all faults are detected within the fault tolerant time interval in the range of a few millisecond, or even within a millisecond.

Drain-to-source comparator outputs can be continuously checked against an expected output level, even when corresponding MOSFET is in OFF state. Implicitly, the toggling of a comparator can be monitored periodically (e.g., a stuck condition can be detected) as the comparators can be configured to have one state during a first operational state of the corresponding power switch (MOSFET ON) and the opposite state in another operational state of the corresponding power switch (MOSFET OFF). In this case, if there is no toggling of the comparator output, a latent fault can be reported to a control unit. Systematically, two monitoring comparators per half-bridge can indicate complementary output levels always after the turn-on time of the active MOSFET, e.g., to ensure that monitoring occurs after so-called "dead time" when both power switches are momentarily OFF. In some cases, within each turn-on interval for any given power switch, the comparator for that given power switch can be checked after the so-called "dead time" t(vds-blank) of the turn-on interval and after a brief filtering time t(vds-filt) of the turn-on interval. Latent faults may be signaled by a logic bit that is stored in the driver and communicated to the control unit, either regularly or when a fault is identified.

The described self-test during runtime allows for a significantly short fault detection interval. Moreover, self-test during runtime can detect a failure of the monitoring feature before critical failure occurs, such that a control unit can decide to stop operation of the motor before entering a critical state when the short circuit monitoring feature is not working properly. Accordingly, the self-testing described in this disclosure can improve the safety of the circuit.

Figure 3:
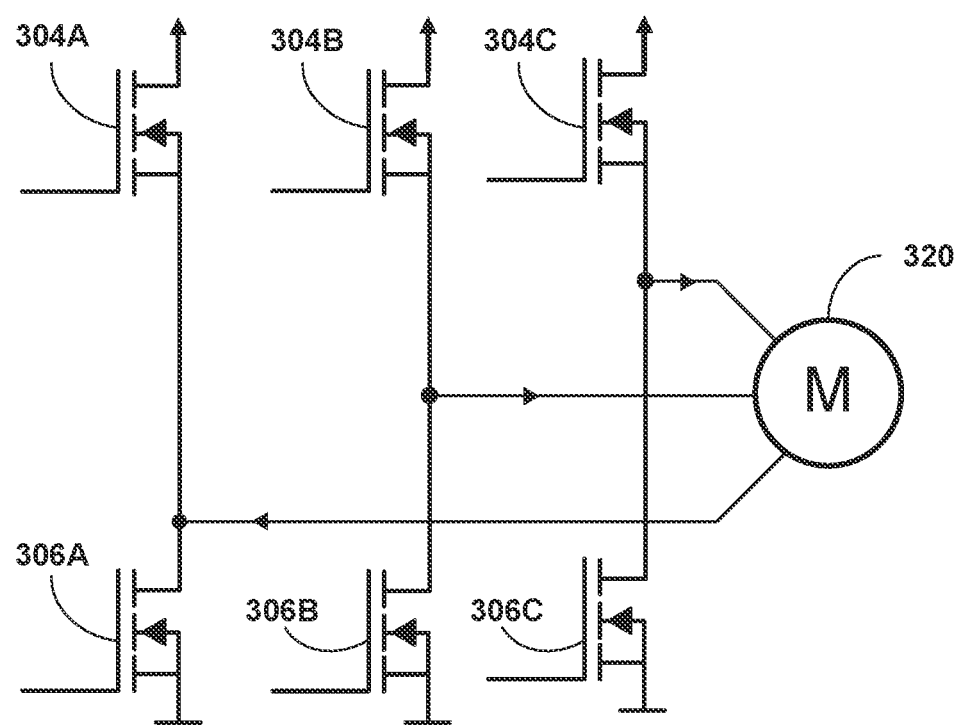
FIG. 3 is a circuit diagram showing three half-bridges arranged to control operation of an electric motor.

FIG. 3 is a circuit diagram showing three half-bridges arranged to control operation of an electric motor. Power switches 304A and 306A define a first half-bridge, power switches 304B and 306B define a second half-bridge, and power switches 304C and 306C define a third half-bridge. Each half-bridge may be controlled by a half-bridge driver circuit similar to half-bridge driver circuit 104 of FIG. 1 or 204A, 204B of FIG. 2. Separate drivers (similar to driver 104 of FIG. 1) could also be used for each half-bridge, or a motor driver could implement a plurality of different drivers for a plurality of half-bridges into one common integrated circuit. Also, the number of phases is not limited to three. The techniques may also apply to each of six half-bridges used to control a six-phase electric motor, or other numbers of phases. Also, the techniques may apply to other settings where half-bridges are used, e.g., for other applications unrelated to motor control.

Figure 4:
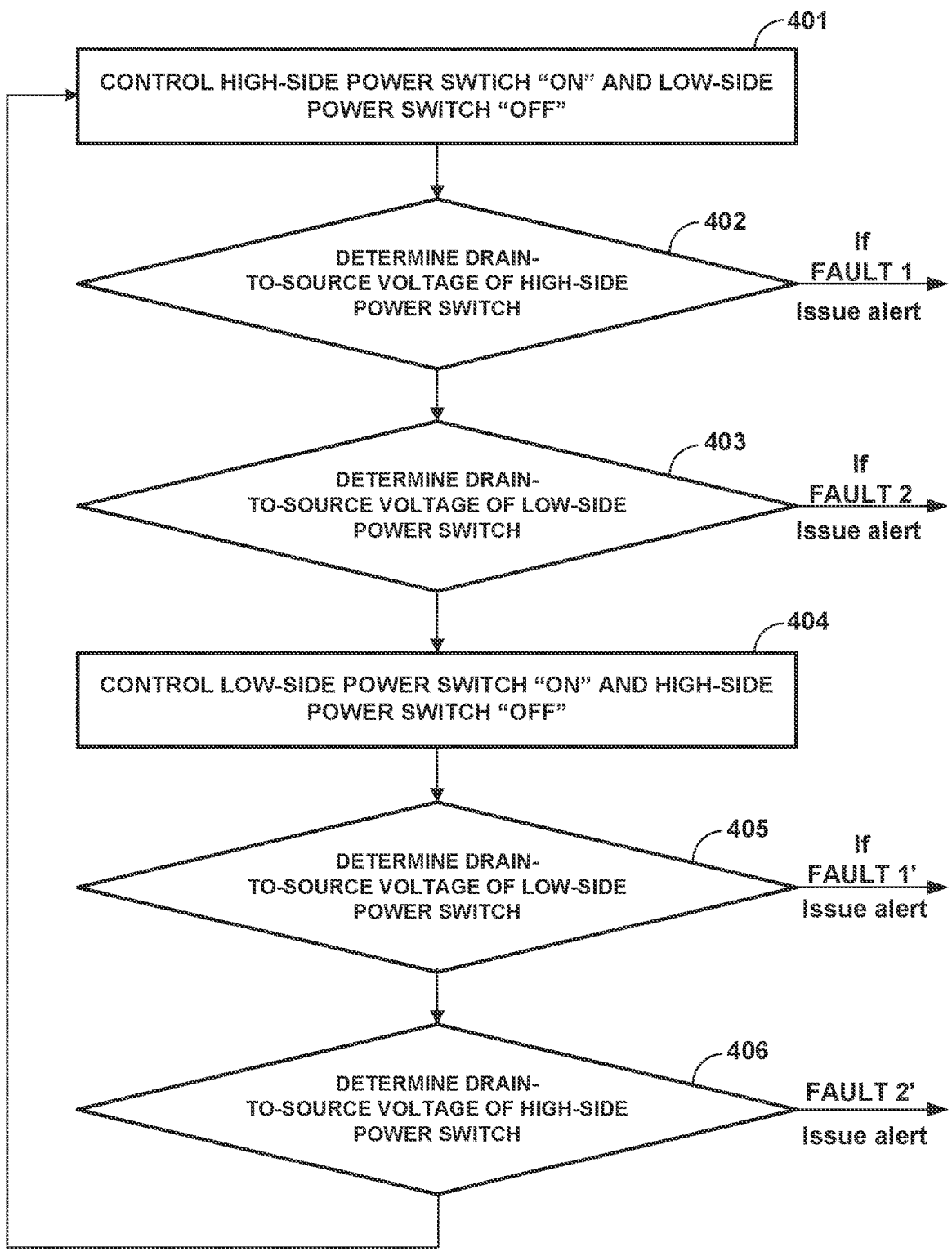
FIG. 4 is a flow diagram showing an example method according to this disclosure.

FIG. 4 is a flow diagram showing an example method according to this disclosure. FIG. 4 will be described from the perspective of half-bridge driver circuit 104 and system 100 of FIG. 1, although other circuits or systems could also implement the method. As shown in FIG. 4, half-bridge driver circuit 104 controls high-side power switch 116 ON and low-side power switch 118 OFF (401). For example, half-bridge driver circuit 104 delivers signals to a gate of high-side power switch 116 via first output pin 122 in order to control high-side power switch 116 to an ON state. In addition, half-bridge driver circuit 104 delivers signals to a gate of low-side power switch 118 in order to control low-side power switch 118 to an OFF state.

When high-side power switch 116 is ON and low-side power switch 118 is OFF, high-side compare unit 108 determines a drain-to-source voltage associated with high-side power switch 116 (402) and low-side compare unit 110 determines a drain-to-source voltage associated with low-side power switch 118 (403). In addition, high-side compare unit 108 may compare the drain-to-source voltage associated with high-side power switch 116 to a threshold, and low-side compare unit 110 may compare the drain-to-source voltage associated with low-side power switch 118 to a threshold. These comparisons can be used to identify whether a fault exists.

If high-side compare unit 108 identifies a fault based on the determined drain-to-source voltage of high-side power switch 116, half-bridge driver circuit 104 may issue an alert command to control unit 102 (shown as "FAULT 1"). In this case, control unit 102 may take appropriate action for system 100, such as disabling half-bridge driver circuit 104 or otherwise controlling system 100 to operate in safe low-power mode until maintenance can be performed. In addition, if low-side compare unit 110 identifies a fault based on the determined drain-to-source voltage of low-side power switch 118, half-bridge driver circuit 104 may issue an alert command to control unit 102 (shown as "FAULT 2"). In this case, control unit 102 may take appropriate action for system 100, such as issuing an alert that low-side compare unit 110 is not reliable, which may also include commands or controls to operate in safe low-power mode until maintenance can be performed on low-side compare unit 110.

As further shown in FIG. 4, half-bridge driver circuit 104 then controls high-side power switch 116 OFF and low-side power switch 118 ON (404). For example, half-bridge driver circuit delivers signals to a gate of high-side power switch 116 via first output pin 122 in order to control high-side power switch 116 to an OFF state, and half-bridge driver circuit 104 delivers signals to a gate of low-side power switch 118 in order to control low-side power switch 118 to an ON state.

When high-side power switch 116 is OFF and low-side power switch 118 is ON, low-side compare unit 110 determines a drain-to-source voltage associated with low-side power switch 118 (405), and high-side compare unit 108 determines a drain-to-source voltage associated with high-side power switch 116 (406). In addition, low-side compare unit 110 may compare the drain-to-source voltage associated with low-side power switch 118 to a threshold, and high-side compare unit 108 may compare the drain-to-source voltage associated with high-side power switch 116 to a threshold. These comparisons can be used to identify whether a fault exists.

If low-side compare unit 110 identifies a fault based on the determined drain-to-source voltage of low-side power switch 118 while in the ON state, half-bridge driver circuit 104 may issue an alert command to control unit 102 (shown as "FAULT 1'"). In this case, control unit 102 may take appropriate action for system 100, such as disabling half-bridge driver circuit 104 or otherwise controlling system 100 to operate in safe low-power mode until maintenance can be performed. In addition, if high-side compare unit 108 identifies a fault based on the determined drain-to-source voltage of high-side power switch 116, half-bridge driver circuit 104 may issue an alert command to control unit 102 (shown as "FAULT 2'"). In this case, control unit 102 may take appropriate action for system 100, such as issuing an alert that high-side compare unit 108 is not reliable, which may also include commands or controls to operate in safe low-power mode until maintenance can be performed on high-side compare unit 108.

Consistent with the steps shown in FIG. 4, a method of controlling a half-bridge that includes a high-side power switch and a low-side power switch may comprise determining a first drain-to-source voltage (402), wherein the first drain-to-source voltage is associated with the high-side power switch when the high-side power switch is ON; determining a second drain-to-source voltage (405), wherein the second drain-to-source voltage is associated with the low-side power switch when the low-side power switch is ON; determining a third drain-to-source voltage (403), wherein the third drain-to-source voltage is associated with the high-side power switch when the high-side power switch is OFF; and determining a fourth drain-to-source voltage (406), wherein the fourth drain-to-source voltage is associated with the low-side power switch when the low-side power switch is OFF. Moreover, this method may occur within each full switching cycle of the half-bridge, during operation. The method may further comprise outputting a first power switch fault signal (e.g., FAULT 1 in FIG. 4) to a control unit in response to the first drain-to-source voltage being higher than a first drain-to-source threshold; outputting a second power switch fault signal to the control unit in response to the second drain-to-source voltage being higher than a second drain-to-source threshold (e.g., FAULT 1' in FIG. 4); and issuing a power switch alert via the control unit in response to the control unit receiving the first power switch fault signal or the second power switch fault signal. In addition, the method may comprise outputting a first comparator fault signal (e.g., FAULT 2 in FIG. 4) to a control unit in response to the third drain-to-source voltage being lower than a third drain-to-source threshold; outputting a second comparator fault signal (e.g., FAULT 2' in FIG. 4) to the control unit in response to the fourth drain-to-source voltage being lower than a fourth drain-to-source threshold; and issuing a maintenance alert via the control unit in response to the control unit receiving the first comparator fault signal or the second comparator fault signal.

The methods described in the preceding paragraph and the methods shown in FIG. 4 may occur in every switching cycle of a half-bridge circuit, and the determinations may be performed in a complementary fashion consistent with the complementary operation of the ON/OFF switching of two power switches in the half-bridge. Accordingly, determining the first drain-to-source voltage (402) associated with the high-side power switch when the high-side power switch is ON may occur while determining the third drain-to-source voltage (403) associated with the low-side power switch when the low-side power switch is OFF. Similarly, determining the second drain-to-source voltage (405) associated with the low-side power switch when the low-side power switch is ON may occur while determining the fourth drain-to-source voltage (406) associated with the high-side power switch when the high-side power switch is OFF.

Power switches described herein (e.g., power switches 116, 118, 216, 218) may each comprise a power transistor, such as a metal oxide semiconductor field effect transistor (MOSFET). The MOSFET may be formed in silicon, in which case the MOSFET may be called a silicon MOSFET. Alternatively, the MOSFET may be formed in another semiconductor material, such as silicon carbide (SiC) or gallium nitride (GaN), in which case the MOSFET may be called a SiC MOSFET or a GaN MOSFET. Indeed, the techniques of this disclosure may be especially useful for monitoring MOSFETS that are used for controlling a three-phase electric motor, such as those used in vehicles for power steering, braking or other functions. The techniques of this disclosure may also work with other types of power switches, such as bipolar gate transistors (BGTs), in which case the drain-to-source monitoring would comprise monitoring of a collector to emitter voltage of the BGTs.

The following clauses may illustrate one or more aspects of the disclosure.

Clause 1—A driver circuit configured to control a half-bridge that includes a high-side power switch and a low-side power switch, the driver circuit comprising: a high-side compare unit configured to determine a first drain-to-source voltage, wherein the first drain-to-source voltage is associated with the high-side power switch when the high-side power switch is ON; and a low-side compare unit configured to determine a second drain-to-source voltage, wherein the second drain-to-source voltage is associated with the low-side power switch when the low-side power switch is ON, wherein the high-side compare unit is further configured to determine a third drain-to-source voltage, wherein the third drain-to-source voltage is associated with the high-side power switch when the high-side power switch is OFF, and wherein the low-side compare unit is further configured to determine a fourth drain-to-source voltage, wherein the fourth drain-to-source voltage is associated with the low-side power switch when the low-side power switch is OFF.

Clause 2—The driver circuit of clause 1, wherein the driver circuit is configured to output one or more fault signals to a control unit based on one or more of the determinations.

Clause 3—The driver circuit of clause 2, wherein the driver circuit is configured to: output a first power switch fault signal to the control unit in response to the first drain-to-source voltage being higher than a first drain-to-source threshold; and output a second power switch fault signal to the control unit in response to the second drain-to-source voltage being higher than a second drain-to-source threshold.

Clause 4—The driver circuit of clause 3, wherein the driver circuit is configured to disable or limit operation of the half-bridge in response to outputting the first or second power switch fault signals.

Clause 5—The driver circuit of clause 3 or 4, wherein the driver circuit is further configured to: output a first comparator fault signal to the control unit in response to the third drain-to-source voltage being lower than a third drain-to-source threshold; and output a second comparator fault signal to the control unit in response to the fourth drain-to-source voltage being lower than a fourth drain-to-source threshold.

Clause 6—The driver circuit of clause 5, wherein the first drain-to-source threshold is equal to the second drain-to-source threshold, and wherein the third drain-to-source threshold is equal to the fourth drain-to-source threshold.

Clause 7—The driver circuit of clause 6, wherein the first and second drain-to-source thresholds are different than the third and fourth drain-to-source thresholds.

Clause 8—The driver circuit of any of clauses 1-7, wherein the driver circuit is configured to control ON/OFF states of the first and second power switches via first and second gate signals delivered to the first and second power switches.

Clause 9—The driver circuit of any of clauses 1-8, further comprising a plurality of driver circuits configured to control a plurality of half-bridges.

Clause 10—The driver circuit of clause 9, wherein the plurality of half-bridges is configured to control a multi-phase electric motor.

Clause 11—A system comprising: a control unit; and a driver circuit configured to receive control signals from the control unit and to control a half-bridge based on the control signals, wherein the half-bridge includes a high-side power switch and a low-side power switch, the driver circuit comprising: a high-side compare unit configured to determine a first drain-to-source voltage, wherein the first drain-to-source voltage is associated with the high-side power switch when the high-side power switch is ON; and a low-side compare unit configured to determine a second drain-to-source voltage, wherein the second drain-to-source voltage is associated with the low-side power switch when the low-side power switch is ON, wherein the high-side compare unit is further configured to determine a third drain-to-source voltage, wherein the third drain-to-source voltage is associated with the high-side power switch when the high-side power switch is OFF, and wherein the low-side compare unit is further configured to determine a fourth drain-to-source voltage, wherein the fourth drain-to-source voltage is associated with the low-side power switch when the low-side power switch is OFF.

Clause 12—The system of clause 11, the system further comprising the high-side power switch and the low-side power switch.

Clause 13—The system of clause 11 or 12, wherein the driver circuit is configured to: output a first power switch fault signal to the control unit in response to the first drain-to-source voltage being higher than a first drain-to-source threshold; and output a second power switch fault signal to the control unit in response to the second drain-to-source voltage being higher than a second drain-to-source threshold.

Clause 14—The system of clause 13, wherein the control unit is configured to disable or limit operation of the half-bridge in response to receiving the first power switch fault signal or the second power switch fault signal.

Clause 15—The system circuit of clause 13 or 14, wherein the driver circuit is further configured to: output a first comparator fault signal to the control unit in response to the third drain-to-source voltage being lower than a third drain-to-source threshold; and output a second comparator fault signal to the control unit in response to the fourth drain-to-source voltage being lower than a fourth drain-to-source threshold.

Clause 16—The system of clause 15, wherein the control unit is configured to issue a maintenance alert for the system in response to receiving the first comparator fault signal or the second comparator fault signal.

Clause 17—The system of any of clauses 11-16, further comprising a plurality of driver circuits configured to control a plurality of half-bridges, wherein the plurality of half-bridges is configured control a multi-phase electric motor.

Clause 18—The system of clause 17, the system further comprising the multi-phase electric motor.

Clause 19—A method of controlling a half-bridge that includes a high-side power switch and a low-side power switch, the method comprising: determining a first drain-to-source voltage, wherein the first drain-to-source voltage is associated with the high-side power switch when the high-side power switch is ON; determining a second drain-to-source voltage, wherein the second drain-to-source voltage is associated with the low-side power switch when the low-side power switch is ON; determining a third drain-to-source voltage, wherein the third drain-to-source voltage is associated with the high-side power switch when the high-side power switch is OFF; and determining a fourth drain-to-source voltage, wherein the fourth drain-to-source voltage is associated with the low-side power switch when the low-side power switch is OFF.

Clause 20—The method of clause 19, further comprising: outputting a first power switch fault signal to a control unit in response to the first drain-to-source voltage being higher than a first drain-to-source threshold; outputting a second power switch fault signal to the control unit in response to the second drain-to-source voltage being higher than a second drain-to-source threshold; and issuing a power switch alert via the control unit in response to the control unit receiving the first power switch fault signal or the second power switch fault signal.

Clause 21—The method of clause 19 or 20, further comprising: outputting a first comparator fault signal to a control unit in response to the third drain-to-source voltage being lower than a third drain-to-source threshold; outputting a second comparator fault signal to the control unit in response to the fourth drain-to-source voltage being lower than a fourth drain-to-source threshold; and issuing a maintenance alert via the control unit in response to the control unit receiving the first comparator fault signal or the second comparator fault signal.

Clause 22—The method of any of clauses 19-21, further comprising: determining the first drain-to-source voltage while determining the third drain-to-source voltage; and determining the second drain-to-source voltage while determining the fourth drain-to-source voltage.

Various aspects have been described in this disclosure. These and other aspects are within the scope of the following claims.

The invention claimed is:

1. A driver circuit configured to control a half-bridge that includes a high-side power switch and a low-side power switch, the driver circuit comprising:
   a high-side compare unit configured to determine a first drain-to-source voltage, wherein the first drain-to-source voltage is associated with the high-side power switch when the high-side power switch is ON; and
   a low-side compare unit configured to determine a second drain-to-source voltage, wherein the second drain-to-source voltage is associated with the low-side power switch when the low-side power switch is ON,
   wherein the high-side compare unit is further configured to determine a third drain-to-source voltage, wherein the third drain-to-source voltage is associated with the high-side power switch when the high-side power switch is OFF, and
   wherein the low-side compare unit is further configured to determine a fourth drain-to-source voltage, wherein the fourth drain-to-source voltage is associated with the low-side power switch when the low-side power switch is OFF.

2. The driver circuit of claim 1, wherein the driver circuit is configured to output one or more fault signals to a control unit based on one or more of the determinations.

3. The driver circuit of claim 2, wherein the driver circuit is configured to:
   output a first power switch fault signal to the control unit in response to the first drain-to-source voltage being higher than a first drain-to-source threshold; and
   output a second power switch fault signal to the control unit in response to the second drain-to-source voltage being higher than a second drain-to-source threshold.

4. The driver circuit of claim 3, wherein the driver circuit is configured to disable or limit operation of the half-bridge in response to outputting the first or second power switch fault signals.

5. The driver circuit of claim 3, wherein the driver circuit is further configured to:
   output a first comparator fault signal to the control unit in response to the third drain-to-source voltage being lower than a third drain-to-source threshold; and
   output a second comparator fault signal to the control unit in response to the fourth drain-to-source voltage being lower than a fourth drain-to-source threshold.

6. The driver circuit of claim 5, wherein the first drain-to-source threshold is equal to the second drain-to-source threshold, and wherein the third drain-to-source threshold is equal to the fourth drain-to-source threshold.

7. The driver circuit of claim 6, wherein the first and second drain-to-source thresholds are different than the third and fourth drain-to-source thresholds.

8. The driver circuit of claim 1, wherein the driver circuit is configured to control ON/OFF states of the first and second power switches via first and second gate signals delivered to the first and second power switches.

9. The driver circuit of claim 1, further comprising a plurality of driver circuits configured to control a plurality of half-bridges.

10. The driver circuit of claim 9, wherein the plurality of half-bridges is configured to control a multi-phase electric motor.

11. A system comprising:
   a control unit; and
   a driver circuit configured to receive control signals from the control unit and to control a half-bridge based on the control signals, wherein the half-bridge includes a high-side power switch and a low-side power switch, the driver circuit comprising:
   a high-side compare unit configured to determine a first drain-to-source voltage, wherein the first drain-to-source voltage is associated with the high-side power switch when the high-side power switch is ON; and
   a low-side compare unit configured to determine a second drain-to-source voltage, wherein the second drain-to-source voltage is associated with the low-side power switch when the low-side power switch is ON,
   wherein the high-side compare unit is further configured to determine a third drain-to-source voltage, wherein the third drain-to-source voltage is associated with the high-side power switch when the high-side power switch is OFF, and
   wherein the low-side compare unit is further configured to determine a fourth drain-to-source voltage, wherein the fourth drain-to-source voltage is associated with the low-side power switch when the low-side power switch is OFF.

12. The system of claim 11, the system further comprising the high-side power switch and the low-side power switch.

13. The system of claim 11, wherein the driver circuit is configured to:
   output a first power switch fault signal to the control unit in response to the first drain-to-source voltage being higher than a first drain-to-source threshold; and
   output a second power switch fault signal to the control unit in response to the second drain-to-source voltage being higher than a second drain-to-source threshold.

14. The system of claim 13, wherein the control unit is configured to disable or limit operation of the half-bridge in response to receiving the first power switch fault signal or the second power switch fault signal.

15. The system of claim 13, wherein the driver circuit is further configured to:
   output a first comparator fault signal to the control unit in response to the third drain-to-source voltage being lower than a third drain-to-source threshold; and
   output a second comparator fault signal to the control unit in response to the fourth drain-to-source voltage being lower than a fourth drain-to-source threshold.

16. The system of claim 15, wherein the control unit is configured to issue a maintenance alert for the system in response to receiving the first comparator fault signal or the second comparator fault signal.

17. The system of claim 11, further comprising a plurality of driver circuits configured to control a plurality of half-bridges, wherein the plurality of half-bridges is configured control a multi-phase electric motor.

18. The system of claim 17, the system further comprising the multi-phase electric motor.

19. A method of controlling a half-bridge that includes a high-side power switch and a low-side power switch, the method comprising:
- determining a first drain-to-source voltage, wherein the first drain-to-source voltage is associated with the high-side power switch when the high-side power switch is ON;
- determining a second drain-to-source voltage, wherein the second drain-to-source voltage is associated with the low-side power switch when the low-side power switch is ON;
- determining a third drain-to-source voltage, wherein the third drain-to-source voltage is associated with the high-side power switch when the high-side power switch is OFF; and
- determining a fourth drain-to-source voltage, wherein the fourth drain-to-source voltage is associated with the low-side power switch when the low-side power switch is OFF.

20. The method of claim 19, further comprising:
- outputting a first power switch fault signal to a control unit in response to the first drain-to-source voltage being higher than a first drain-to-source threshold;
- outputting a second power switch fault signal to the control unit in response to the second drain-to-source voltage being higher than a second drain-to-source threshold; and
- issuing a power switch alert via the control unit in response to the control unit receiving the first power switch fault signal or the second power switch fault signal.

21. The method of claim 19, further comprising:
- outputting a first comparator fault signal to a control unit in response to the third drain-to-source voltage being lower than a third drain-to-source threshold;
- outputting a second comparator fault signal to the control unit in response to the fourth drain-to-source voltage being lower than a fourth drain-to-source threshold; and
- issuing a maintenance alert via the control unit in response to the control unit receiving the first comparator fault signal or the second comparator fault signal.

22. The method of claim 19, further comprising:
- determining the first drain-to-source voltage while determining the third drain-to-source voltage; and
- determining the second drain-to-source voltage while determining the fourth drain-to-source voltage.

* * * * *